US006375695B2

(12) United States Patent
Machida et al.

(10) Patent No.: US 6,375,695 B2
(45) **Date of Patent: *Apr. 23, 2002**

(54) METHOD AND APPARATUS FOR PROCESSING EXHAUST GAS

(75) Inventors: Minoru Machida; Toshio Yamada, both of Nagoya; Takeshi Naito, Komaki; Yukihito Ichikawa, Nagoya, all of (JP)

(73) Assignee: NGK Insulators, Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/401,984

(22) Filed: Mar. 10, 1995

(30) Foreign Application Priority Data

Mar. 23, 1994 (JP) ............................................ 6-051757
Feb. 8, 1995 (JP) ............................................ 7-020042

(51) Int. Cl.[7] .......................... B01D 39/20; F01N 3/023

(52) U.S. Cl. .......................... 55/282.3; 55/287; 55/302; 55/484; 55/523; 55/DIG. 10

(58) Field of Search .......................... 55/282, 286, 287, 55/302, 431, 466, 484, 284, 523, DIG. 10, DIG. 30, 282.3; 219/260, 267, 270

(56) References Cited

U.S. PATENT DOCUMENTS

| | | | | | |
|---|---|---|---|---|---|
| 1,921,047 | A | * | 8/1933 | Sword | 219/270 |
| 2,150,687 | A | * | 3/1939 | Kunowich | 219/270 |
| 2,653,213 | A | * | 9/1953 | Comstock | 219/260 |
| 2,798,928 | A | * | 7/1957 | Freidberg | 219/267 |
| 4,404,798 | A | * | 9/1983 | Takagi et al. | 55/DIG. 10 |
| 4,481,767 | A | * | 11/1984 | Stark | 55/DIG. 10 |
| 4,544,388 | A | * | 10/1985 | Rao et al. | 55/282.3 |
| 4,549,399 | A | * | 10/1985 | Usui et al. | 55/DIG. 10 |
| 4,833,883 | A | * | 5/1989 | Oda et al. | 55/302 |
| 4,874,407 | A | * | 10/1989 | Lefkowitz | 55/282.3 |
| 4,875,335 | A | * | 10/1989 | Arai et al. | 55/282.3 |
| 4,923,484 | A | * | 5/1990 | Saito | 55/DIG. 10 |
| 5,045,097 | A | * | 9/1991 | Langen | 55/282 |
| 5,253,476 | A | * | 10/1993 | Levendis et al. | 55/302 |
| 5,390,492 | A | * | 2/1995 | Levendis | 55/302 |
| 5,426,936 | A | * | 6/1995 | Levendis et al. | 55/302 |

FOREIGN PATENT DOCUMENTS

| | | | | |
|---|---|---|---|---|
| DE | 3828516 | * | 3/1989 | 55/DIG. 10 |
| EP | 0327439 | * | 8/1989 | 55/DIG. 10 |
| EP | 0382704 | | 8/1990 | |
| EP | 0528289 | | 2/1993 | |
| JP | 64-77715 | * | 3/1989 | 55/DIG. 10 |
| JP | 1-159408 | | 6/1989 | |
| JP | 4-12113 | * | 1/1992 | 55/DIG. 10 |
| JP | 4-267913 | * | 9/1992 | 55/DIG. 10 |
| JP | 5-168834 | * | 7/1993 | 55/DIG. 10 |
| JP | 7-54632 | | 2/1995 | |

* cited by examiner

*Primary Examiner*—C. Scott Bushey
(74) *Attorney, Agent, or Firm*—Parkhurst & Wendel, LLP

(57) ABSTRACT

Filter has a filter main body, a container, a first counter room, and a second counter room. A counter air is introduced into the first counter room through the counter air discharge valve, and fine particles trapped in the filter main body are removed and transported to the second counter room. Then, the removed fine particles are further transported to a process portion isolated from an exhaust gas passage, and the fine particles are fired in the process portion. Since the process portion is isolated from the exhaust gas passage, the fine particles in the process portion are not returned to the filter main body. Moreover, since the fine particles are transported by the counter air only to the second counter room, it is possible to reduce an amount of the counter air.

8 Claims, 11 Drawing Sheets

METHOD AND APPARATUS FOR PROCESSING EXHAUST GAS

BACKGROUND OF THE INVENTION

1. Field of the Invention

The present invention relates to a method and an apparatus for processing an exhaust gas discharged from an internal combustion engine such as a diesel engine, in which fine particles (i.e. soot) trapped in a filter are removed outside of the filter so as to regenerate the filter and the removed fine particles are transported outside of an exhaust system and processed.

2. Related Art Statement

An exhaust gas discharged from a diesel engine includes a large number of fine particles mainly made of carbon, and thus this is a cause of a public nuisance generation. Therefore, various methods for trapping or eliminating such fine particles in an exhaust gas are disclosed.

For example, Japanese Patent Laid-Open Publication No. 1-159408 (JP-A-1-159408) discloses a method of removing fine particles trapped in a filter by using an intermittent counter flow and firing the removed fine particles in a re-trapping portion arranged in an exhaust gas passage near the filter. Moreover, Japanese Patent Application No. 5-198409 discloses a method of removing fine particles by using two kinds of counter flows, transporting the removed fine particles to a place remote from the filter and outside of the exhaust gas passage by the counter flow mentioned above, and firing the removed and transported fine particles.

However, in the method disclosed in JP-A-1-159408, since the re-trapping portion is arranged under the filter or in the exhaust gas passage near the filter, there is a possibility that the fine particles once removed by using the counter flow are returned to the filter by an exhaust gas.

Moreover, in the method disclosed in Japanese Patent Application No. 5-198409, since it is necessary to use two kinds of the counter flows, the apparatus for performing the method mentioned above is complicated. Further, since it is necessary to transport the removed fine particles to the place remote from the filter by using the counter flow, a large amount of the counter flow must be used. If the method mentioned above is used for an apparatus of processing an exhaust gas from an engine, it is preferred that an air supply source used for an exhaust brake system, for example, of the vehicle is used for a counter air supply source from the viewpoint of cost, size, etc. In this case, if a large amount of the counter air is used, it is necessary to make an actuator of the exhaust brake system large, and this causes a bad operation of the actuator.

SUMMARY OF THE INVENTION

It is an object of the present invention to eliminate the drawbacks mentioned above and to provide a method and an apparatus for processing an exhaust gas, in which, if fine particles are removed from a filter, transported by a counter flow and processed, the removed fine particles are not returned to the filter.

It is another object of the present invention to provide a method and an apparatus for processing an exhaust gas, in which fine particles can be removed, transported and processed effectively even by a small amount of the counter air.

It is another object of the present invention to provide a method and an apparatus for processing an exhaust gas, in which fine particles can be removed, transported and processed effectively by an apparatus having an simple constitution.

According to the invention, a method for processing an exhaust gas discharged from an internal combustion engine, in which fine particles trapped in a filter main body of a filter are removed by flowing an intermittent counter air, whose flowing direction is reversed to an exhaust gas flowing direction, through said filter main body, and the removed fine particles are transported outside of an exhaust gas system and are processed, comprises a first step in which an exhaust gas flow is stopped, and said counter air is supplied intermittently from a counter air discharge valve through a counter air supply pipe into a first counter room arranged at a downstream position of said filter main body; a second step in which fine particles trapped in said filter main body are removed by said counter air flowing through said filter main body; a third step in which said removed fine particles are transported to a second counter room arranged at an upstream position of said filter main body by said counter flow, and said transported fine particles are further transported to a process portion arranged at said second room and isolated from said exhaust gas flow; and a fourth step in which said transported fine particles are fired in said process portion.

Moreover, according to the invention, an apparatus for processing an exhaust gas discharged from an internal combustion engine, in which fine particles trapped in a filter main body of a filter are removed by flowing an intermittent counter air, whose flowing direction is reversed to an exhaust gas flowing direction, through said filter main body, and the removed fine particles are transported outside of an exhaust gas system and are processed, comprises a filter having a first counter room arranged at a downstream position of said filter main body and a second counter room arranged at an upstream position of said filter main body; an exhaust gas supply pipe for supplying said exhaust gas to said filter; an exhaust gas discharge pipe communicated from said first counter room to an outside; a process portion arranged at said second room and isolated from said exhaust gas flow, in which said removed fine particles are fired; a transport pipe, one end of which is connected to said second counter room and the other end of which is connected to said process portion; a counter air supply means for for supplying a counter air, whose flowing direction is reversed to said exhaust gas flowing direction, to said counter room; an exhaust gas supply valve arranged in said exhaust gas supply pipe; and an exhaust gas discharge valve arranged in said exhaust gas discharging pipe.

DESCRIPTION OF THE PREFERRED EMBODIMENT

Hereinafter, the present invention will be explained in detail with reference to the drawings.

First Embodiment

Figure 1:
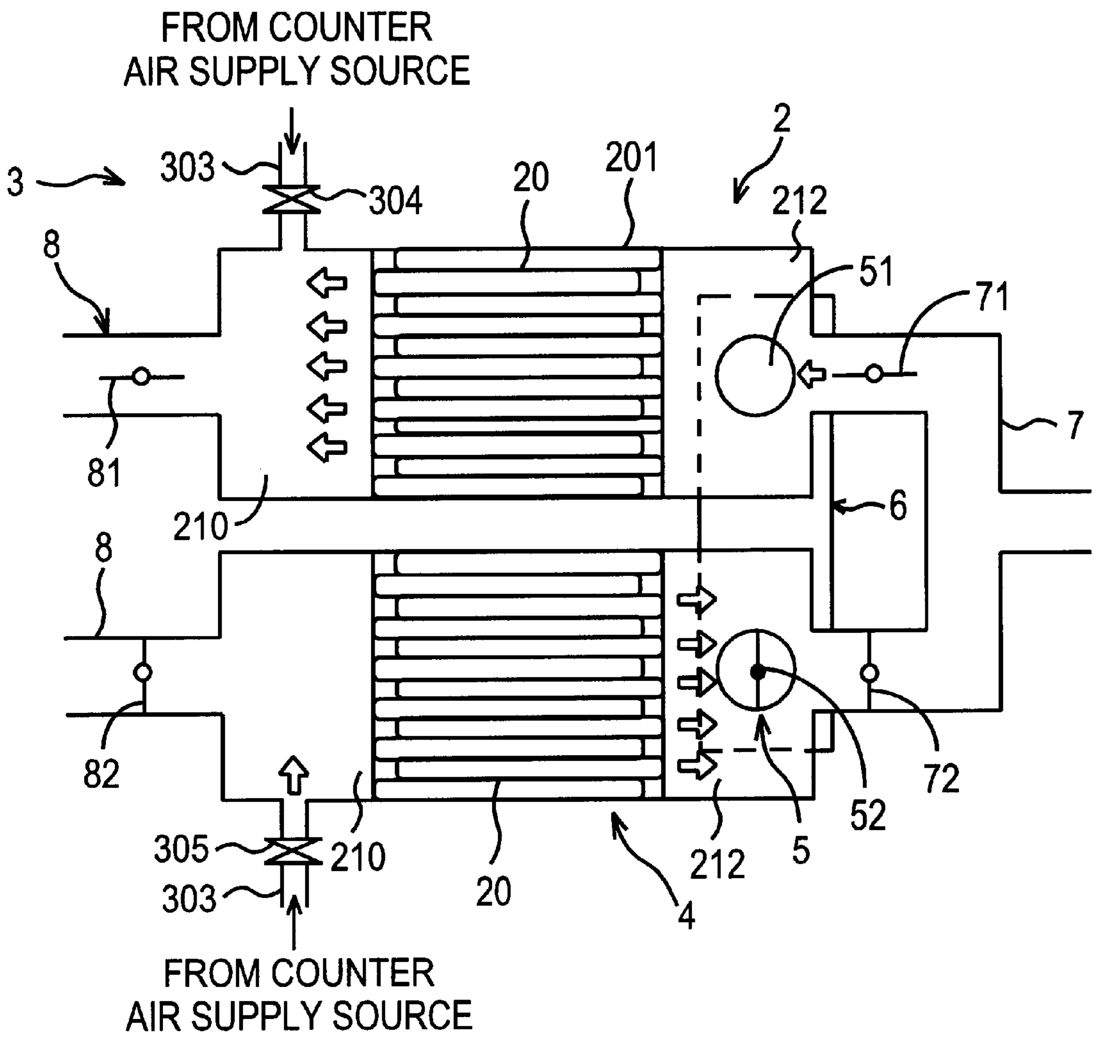
FIG. 1 is a schematic view showing a first embodiment of an exhaust gas processing apparatus according to a present invention.
Figure 2:
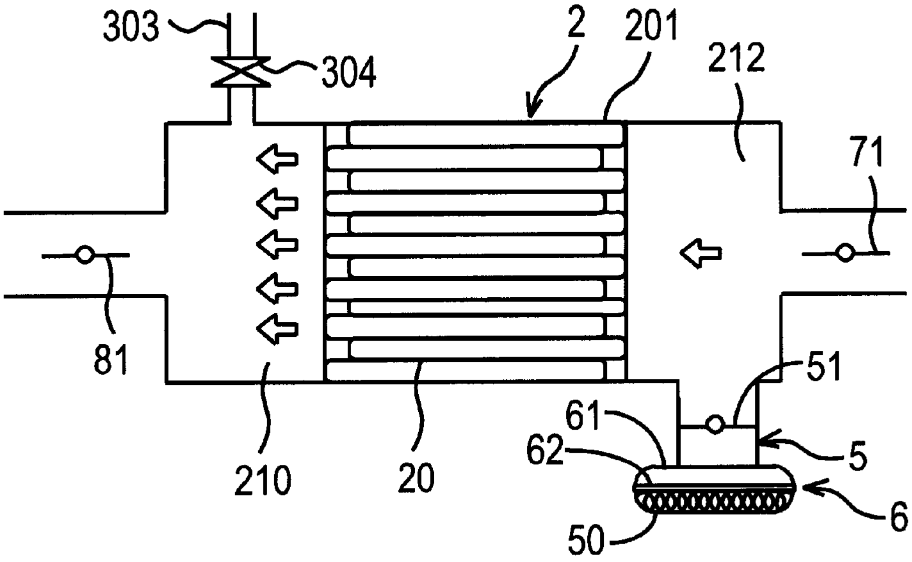
FIG. 2 is a schematic view illustrating a main portion of the first embodiment in the case of a fine particle trapping operation according to the invention.
Figure 3:
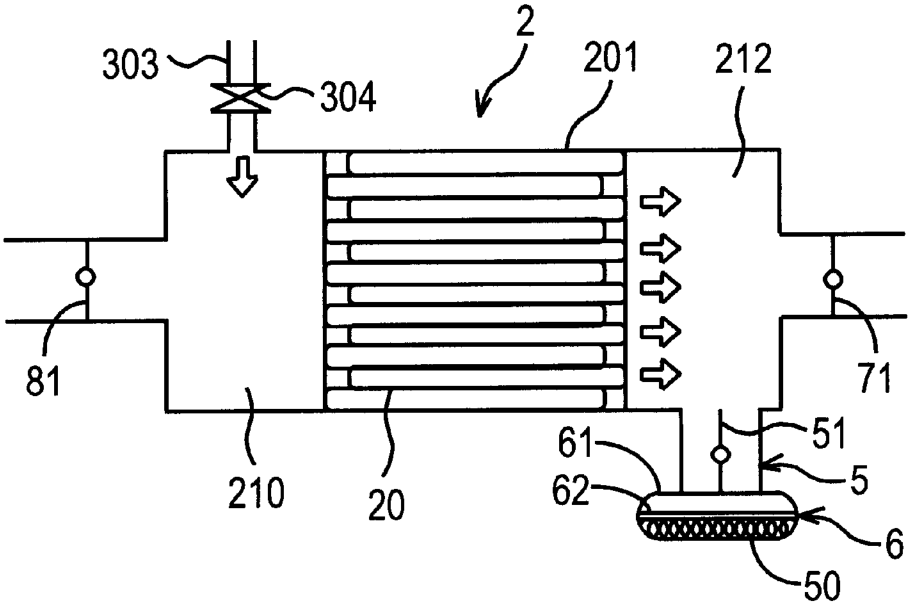
FIG. 3 is a schematic view depicting a main portion of the first embodiment in the case of a filter regenerating operation according to the invention.

FIGS. 1 to 10 are schematic views respectively showing the first embodiment of the invention. As shown in FIG. 1, an apparatus for processing an exhaust gas according to the first embodiment of the invention comprises (1) filters 2, 4, (2) counter air supply portion 3, (3) exhaust gas supply pipe 7, (4) exhaust gas discharge pipe 8, (5) transport pipe 5, (6) process portion 6.

(1) Filter

As shown in FIG. 1, an exhaust gas discharged from a diesel engine can be flowed through one of or both of a first filter 2 and a second filter 4. In this embodiment, if the first filter 2 and the second filter 4 are alternately regenerated, an exhaust gas processing operation can be continuously performed.

Figure 7:
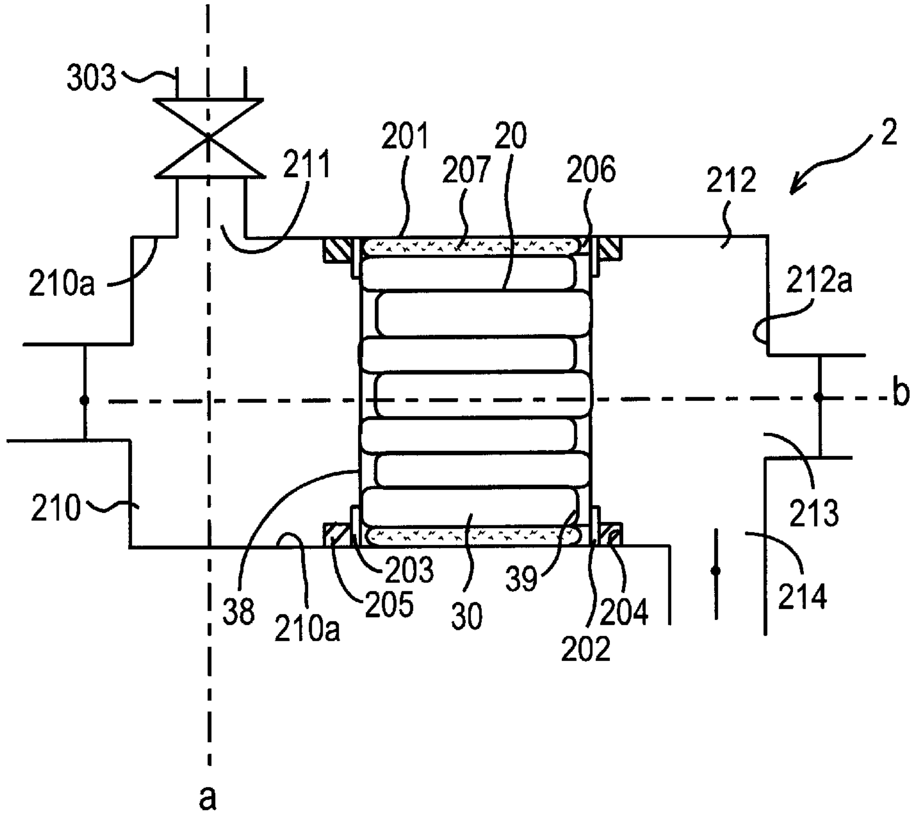
FIG. 7 is a schematic view showing a filter of the first embodiment according to the invention.
Figure 8:
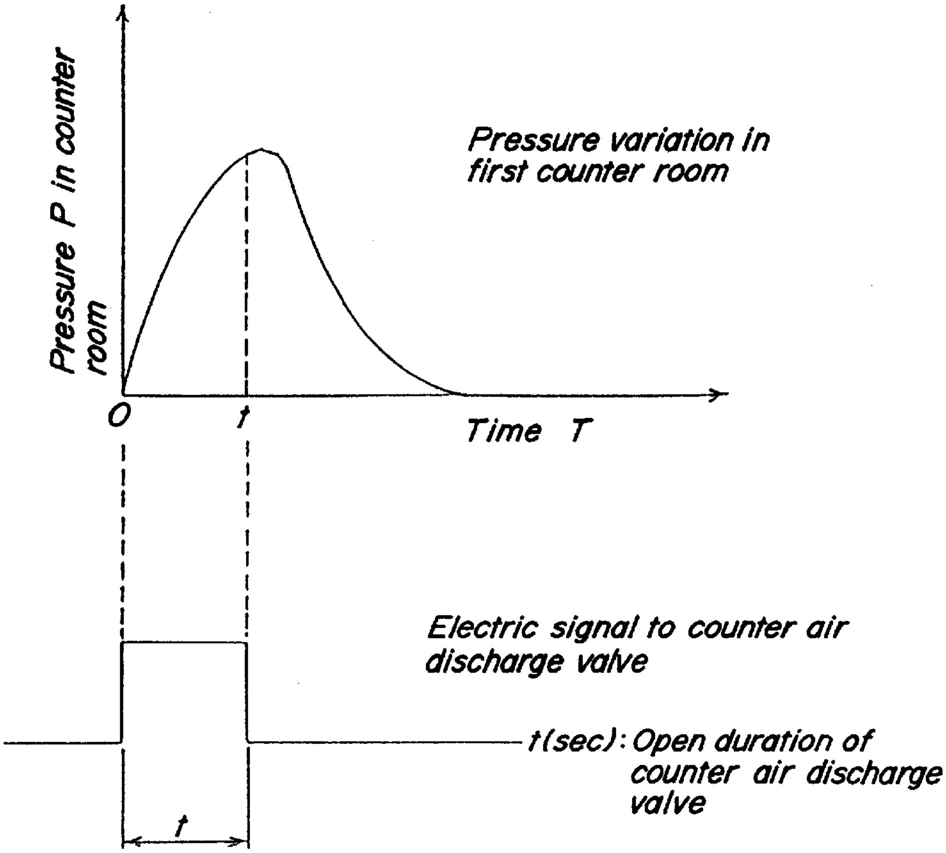
FIG. 8 is a graph illustrating a relation in a first counter room between pressure variation and time according to the first embodiment of the invention.

FIG. 7 is a schematic view showing a construction of the filter 2 or 4. As shown in FIG. 7, a filter main body 20 is accommodated in a container 201 having a cylindrical shape. A first counter room 210 is formed at a downstream position of the filter main body 20, and a second counter room 212 is formed at an upstream position of the filter main body 20.

Figure 4:
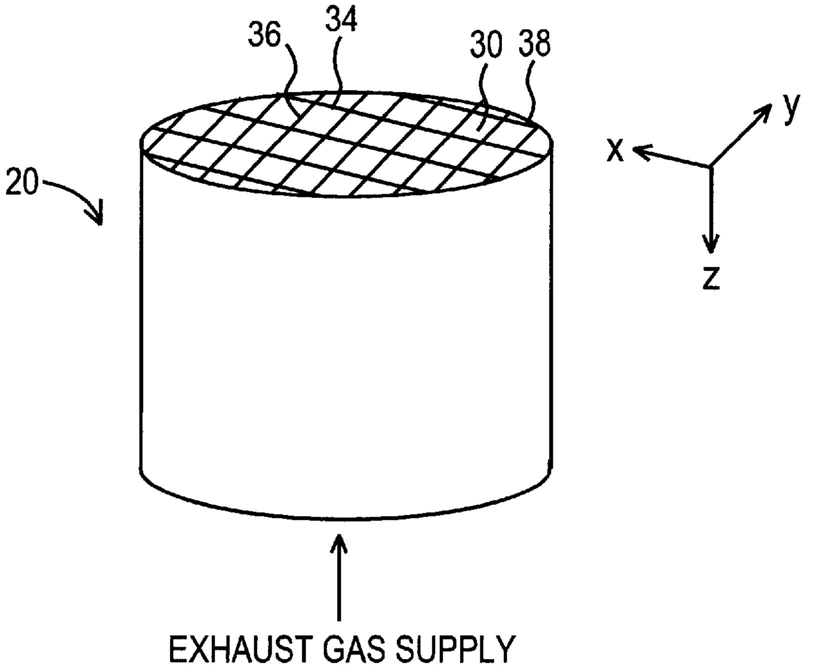
FIG. 4 is a perspective view showing one embodiment of a filter main body according to the first embodiment of the invention.
Figure 5:
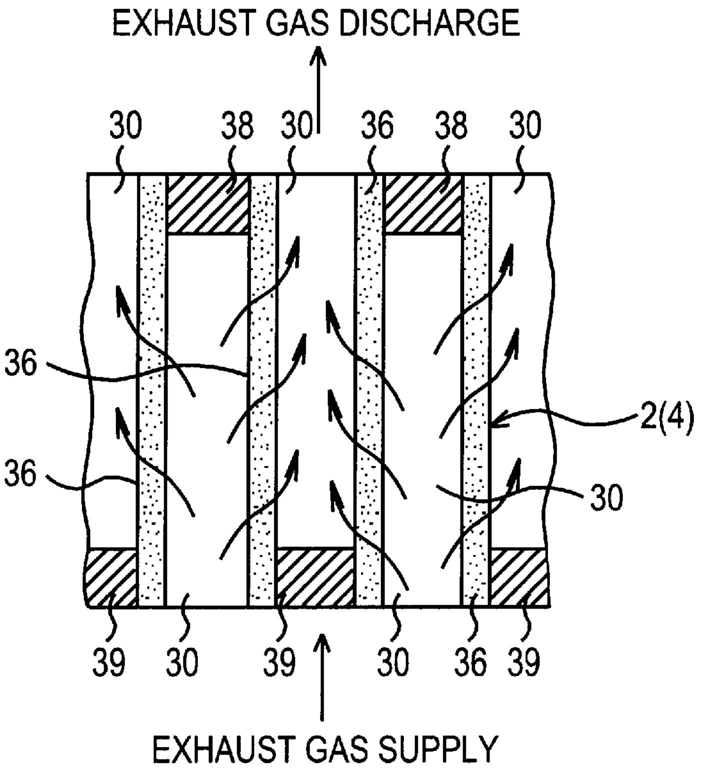
FIG. 5 is a cross sectional view illustrating one embodiment of the filter main body shown in FIG. 4.

The filter main body 20 is made of a porous honeycomb structural body having a cylindrical shape, which is formed integrally by extruding a cordierite batch. As shown in FIGS. 4 and 5, a number of through holes 30 arranged parallel to an axis of the filter main body 20 are formed. The through holes 30 have such a construction that partition walls 34 extending in an x direction and partition walls 36 extending in a y direction are crossed with each other and the crossed partition walls 34 and 36 are extended in a z direction, as shown in FIG. 4. One end of the through hole 30 is sealed by a plug member 38, and the other end of the adjacent through hole 30 is sealed by a plug member 39. In this case, as shown in FIG. 4, the through holes 30 arranged at both ends of the filter main body 20 are sealed by the plug members 38 and 39 like a checker flag pattern. Therefore, as shown in FIG. 5, an exhaust gas is supplied from the through holes 30, at which the plug members 39 are arranged, into the filter main body 20. Then, the supplied exhaust gas is passed through the partition walls 36 as shown by an arrow in FIG. 5. Then, the passed through exhaust gas is discharged from the adjacent through holes 30. In this case, fine particles in the exhaust gas are trapped by the partition walls 36 at its exhaust gas supply side. The trapped fine particles are piled up gradually corresponding to a lapse of time.

As shown in FIG. 7, the filter main body 20 is secured to an inner wall 201*a* of the cylindrical container 201 by seal rings 202, 203 and support rings 204,205. A space 206 is formed between the filter main body 20 and the inner wall 201*a* of the container 201. A filter support member 207 is arranged in the space 206. As for the filter support member 207, use is made of a ceramic mat used for supporting a catalyst carrier of an exhaust gas purifying converter assembled in a gasoline engine vehicle. The filter support member 207 functions to not only support but also cushion the filter main body 20. In this embodiment, as for the filter support member use may be made of a combination of the ceramic mat and a stainless wire mesh mat.

The seal rings 202, 203 have a circular shape. In order to airtightly seal a boundary between a circumferential peripheral portion of an exhaust gas inlet end or an exhaust gas outlet end of the filter main body 20 and the inner wall 201*a* of the container 201, a gasket not shown is arranged between the seal ring 202 or 203 and the filter main body 20. The support rings 204, 205 have also a circular shape. The support rings 204, 205 are secured to the inner wall 201*a* of the container 201 by a bolt not shown in such a manner that the filter main body 20 is compressed in a through hole direction by the support rings 204 and 205.

The first counter room 210 is formed in the container 201 at an exhaust gas downstream position of the filter main body 20. A counter air supply inlet 211 is communicated to an inner wall 210*a* of the first counter room 210. The second counter room 212 is formed in the container 201 at an upstream position of the filter main body 20. An exhaust gas supply inlet 213 and a transport inlet 214 are communicated to an inner wall 212*a* of the second counter room 212. The transport inlet 214 is arranged downward from the exhaust gas supply inlet 213.

In the embodiment mentioned above, since the filter main body 20 is secured to the inner wall 201*a* of the container 201 with the space, the filter main body 20 is not moved gradually if a vibration due to the engine or a vibration during a movement of the vehicle is applied thereto, and thus it is possible to prevent crack generation and breakage of the filter main body 20. Moreover, the filter main body 20 is made of the honeycomb structural body, and thus it endures a relatively high compression strength in a through hole direction. Therefore, if the support rings 204, 205 are secured to the inner wall 201*a* of the container 201 by a bolt and so on in such a manner that the filter main body 20 is compressed in a through hole direction by the support rings 204 and 205, it is also possible to support the filter main body 20 without cracking or breaking.

Further, since a boundary between a circumferential peripheral portion of an exhaust gas inlet end or an exhaust gas outlet end of the filter main body 20 and the inner wall 201*a* of the container 201 is sealed, all the exhaust gas can be passed through the filter main body 20. Moreover, in this case, since the exhaust gas is not directly supplied to the filter support member 207, it is possible to prevent deterioration of the filter support member 207. Furthermore, since the filter main body 20 is partly supported by pressure applied to the above sealed portion, it is possible to decrease a support pressure of the filter main body 20, and thus it is possible to prevent a breakage of the filter main body 20.

It should be noted that a cross section of the filter is generally circular, but it is possible to use the filter having a square, a rectangular, an ellipse, or the other cross section. Moreover, a shape of the through hole is generally square, but it is possible to use the through hole having a circular, a triangular, or a hexagonal shape.

As the materials for the filter, it is preferred to use a porous cordierite from the view point of a thermal shock resistivity, durability, gas seal performance and fine particle trapping performance, and to form the filter by an integral extrusion. However, it is possible to use a porous ceramic material such as cordierite, alumina, mullite, silicon carbide, silicon nitride, zirconia, or a three-dimensional net structural body made of a fired porous metal, a ceramic fiber or a fiber material such as a metal fiber and so on.

Moreover, since the filter is porous, it functions as a muffler. Therefore, it is possible to further decrease an exhaust noise if used together with a usual muffler. As a comparison, the exhaust noises in the case that only the usual muffler was used and in the case that the filter was used together with the usual muffler, were detected by a noise meter set beyond a tail pipe. As a result, if the filter is used together together with the usual muffler, it is possible to decrease the exhaust noise by about 5 dB.

(2) Counter air supply portion

As shown in FIG. 1, the counter air supply portion 3 is arranged at an exhaust gas downstream position of the filter 2 or 4 (i.e., at a side of the plug member 38 of the filter 2 or 4). The counter air portion 3 comprises counter air supply portions 3 and counter air discharge valves 304 and 305. For example, as the counter air discharge valves 304 and 305, use is made of a magnetic valve which can perform opening and closing operations in a short time. As shown in FIG. 7, one end of the counter air supply pipe 303 is communicated with the first counter room 210 of the filter 2 or 4 at the counter air supply inlet 211. The counter air supply inlet 211 has no valve, and thus it has a sufficient open area.

In FIG. 7, an axis (a) of a counter air flowing direction in the counter air supply pipe 303 is not parallel to an axis (b) of the through hole in the filter main body 20. In this case, the axis (a) is crossed orthogonally with respect to the axis (b). However, in this invention, it is possible to incline the axis (a) with respect to the axis (b).

Moreover, the other end of the counter air supply pipe 303 is communicated with a counter air tank, and the counter air tank is communicated with a counter air supply source. As the counter air supply source, it is preferred to use a compressor used for an exhaust gas brake system of the vehicle from the view points of simplicity and cost.

Further, in order to minimize an amount of the counter air to be used, it is necessary to set properly an amount of the counter air tank, a dimension of the pipe from the counter air tank to the counter air discharge valve, an opening diameter of the counter air discharge valve, a flow coefficient, a dimension of the pipe from the counter air discharge valve to the first counter room, an amount of the first counter room or the second counter room, a dimension of the filter, a shape of the filter, and so on.

Figure 6:
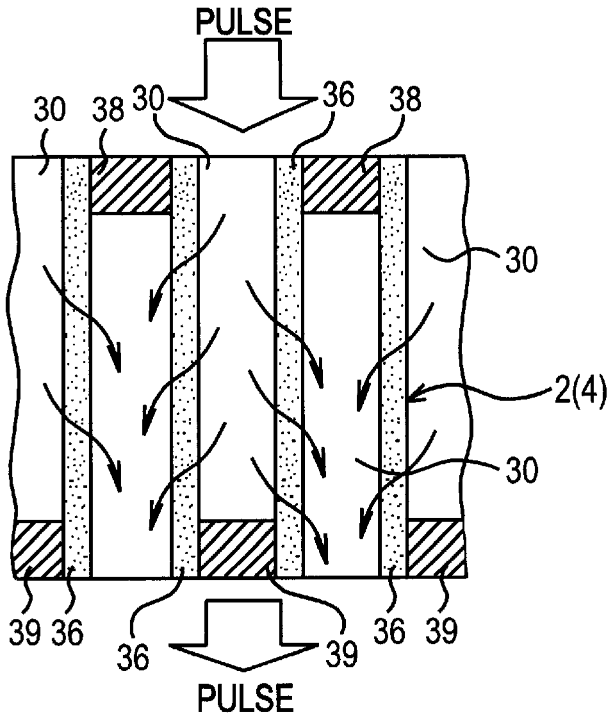
FIG. 6 is a cross sectional view depicting one embodiment of the filter main body in the case of the filter regenerating operation according to the invention.

If the counter air discharge valves 304, 305 are opened, the compressed counter air is flowed into the first counter room 210 through the counter air supply pipe 303. Therefore, an air pressure of the first counter room 210 is rapidly increased. Then, as shown in FIG. 6 by arrows, the counter air is supplied to the through holes 30, passed through the partition walls 36, and discharged from the adjacent through holes 30. Thereby, the fine particles filled up in the through holes 30 are discharged into the second counter room 212.

Since the counter air supply inlet 211 has a sufficient opening area, a large amount of the counter air can be supplied in the first counter room in a short time. Therefore, a large shock can be applied to the through holes 30 of the filter main body 20. Moreover, since the axis (a) of the counter air flowing direction in the counter air supply pipe 303 is not parallel to the axis (b) of the through hole in the filter main body 20, a rapid pressure increase due to the counter air supplied in the first counter room 210 can be uniformly applied to a surface at an exhaust gas supply side of the filter main body 20. That is to say, it is possible to prevent a local counter air flow, and thus the fine particles can be uniformly removed from the partition wall of the filter main body 20, and the removed fine particles can be transported into the second counter room 212.

In the present invention, it is possible to project one end of the counter air supply pipe in the first counter room. Moreover, it is preferred to decrease a pressure loss in the case that the counter air is supplied into the first counter room by arranging a wider taper portion at the end of the counter air supply pipe in the first counter room.

(3) Exhaust gas supply pipe

One end of the exhaust gas supply pipe 7 is communicated with a diesel engine so as to introduce an exhaust gas, and the other end of the exhaust gas supply pipe 7 is communicated with the exhaust gas supply inlet 213 arranged at the inner wall 212*a* of the second counter room 212 in the filter 2 or 4. Exhaust supply valves 71 and 72 are arranged in the exhaust gas supply pipe 7 at a position near the filter 2 or 4.

During the filter regenerating operation by the counter air, if the exhaust gas supply valves 71, 72 are closed and the counter air is supplied, the fine particles removed from the filter 2 or 4 are not returned into the exhaust gas supply pipe 7 by the counter air. Moreover, the fine particles in the exhaust gas are not introduced into the filter 2 or 4.

(4) Exhaust gas discharge pipe

One end of the exhaust gas discharge pipe 8 is communicated with the first counter room 210 of the filter 2 or 4, and the other end of the exhaust gas discharge pipe 8 is communicated with the muffler. Exhaust gas discharge valves 81 and 82 are respectively arranged in the exhaust gas discharge pipes 8 at a position near the filter main room 20. The exhaust gas after the fine particle trapping operation is discharged from the exhaust gas discharge pipe 8 to the muffler.

During the filter regenerating operation by the counter air, if the exhaust gas discharge valves 81 and 82 are closed and the counter air is supplied, a pressure in the first counter room is increased rapidly, and thus the fine particles can be removed sufficiently. Moreover, the removed fine particles can be effectively transported into the second counter room 212.

(5) Transport pipe

One end of the transport pipe 5 is communicated with a transport inlet 214 arranged at the inner wall 212*a* of the first counter room 212 in the filter 2 or 4, and the other end of the transport pipe 5 is communicated with the process portion 6. The transport inlet 214 is arranged downward with respect to the exhaust gas supply inlet 213. Particle discharge valves 51 and 52 are respectively arranged in the transport valve 5 at a position near the transport inlet 214.

If the particle discharge valves 51 and 52 are opened, the removed particles in the second counter room 212 can be transported into the process portion 6 through the transport inlet 214 and the the transport pipe 5 by gravity.

(6) Process portion

The process portion 6 is arranged under the filter 2 or 4, i.e. at a position outside of the exhaust gas system. In the process portion 6, the fine particles removed from the filter main body 20 and transported through the transport pipe 5 are fired. In this case, if a distance from an exhaust gas supply end of the filter main body 20 to the process portion is long, it is necessary to use a larger counter air supply apparatus, and thus a vehicle carrying performance becomes worse. At the same time, it is necessary to use a large amount of the counter air for transporting the fine particles. It is preferred to set the distance mentioned above to less than 100 cm, preferably to less than 70 cm, more preferably to less than 40 cm.

Figure 10:
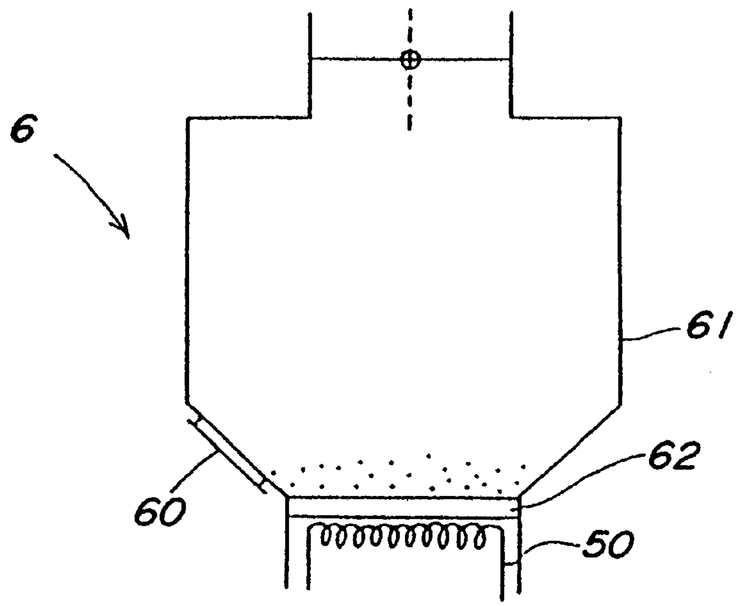
FIG. 10 is a cross sectional view showing one embodiment of a process portion according to the first embodiment of the invention.

As shown in FIG. 10, the process portion 6 comprises a process container 61, a plate 62 arranged at a bottom of the process container 61, and a discharge outlet 60. The fine particles transported to the process portion 6 through the transport pipe 5 fall down to the plate 62 by gravity. The plate 62 is a stainless plate having a thickness of 0.5–2 mm. An electric heater 50 is arranged under the plate 62. As the heater 50, use is made of a resistance heating wire of 200 W, which is wound like a spiral under the plate 62. The plate 62 is heated by the heater 50, and the fine particles piled up on the plate 62 are fired. After that, a residual ash component is discharged from the discharge outlet 60.

In the first embodiment mentioned above, as shown in FIG. 1, the one process portion is used for both of the first filter and the second filter, but it is possible to arrange the process portions for the first filter and the second filter respectively.

In the present invention, the electric heater is arranged under the plate, but it is possible to arrange the electric heater in the plate. Moreover, as a fine particle firing means, use is made of a sheath heater or a glow plug in which the fine particles are fired around it, or a burner for firing the fine particle directly. Further, it is possible to improve a firing performance of the fine particles by using an oxidizing catalyst or a microwave generator together with the firing means mentioned above. In this case, the firing improvement means is arranged at a position near the second counter room as compared with the firing means. Moreover, a filter through which an air is transmitted may be arranged at a part of the process container. In this case, an oxygen component necessary for firing can be introduced through the filter.

Moreover, as the plate, use may be made of a ceramic plate. In this case, it is possible to use a far infrared effect of the ceramic plate.

Hereinafter, valve changeover operations in a trapping mode and in a counter air processing mode and an ON/OFF operation of the counter air will be explained with reference to FIGS. 1, 2, 3, 8, and 9.

In the trapping mode, as shown in FIG. 1, the exhaust gas discharge valves 81 and 82 and the exhaust gas supply valves 71 and 72 are opened, and the particle discharge valves 51 and 52 are closed. In this case, the fine particles in the exhaust gas from the diesel engine are trapped by the filter 2 or 4.

Then, in the counter air processing mode, the filter main body 20 is subjected to the counter air periodically. This counter air processing process comprises (A) regenerating process, (B) transporting process, and (C) processing process.

(A) Regenerating process

Figure 9:
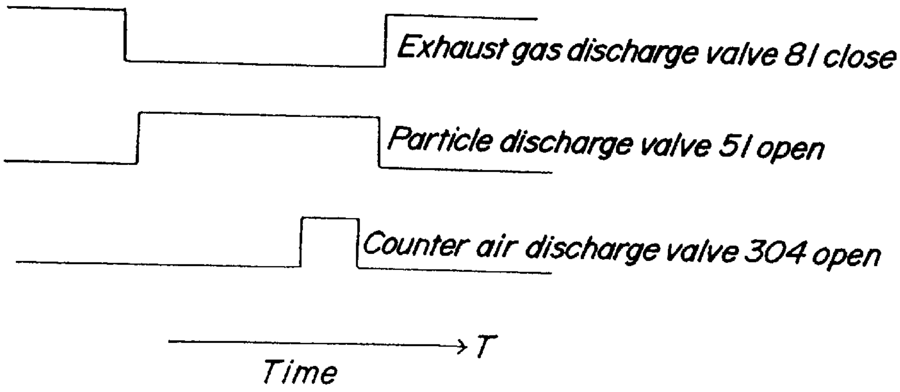
FIG. 9 is a timing chart depicting operations of exhaust gas supply valves and a counter air discharge valve according to the first embodiment of the invention.

In the regenerating process, as shown in FIG. 9, the exhaust gas discharge valve 81 and the exhaust gas supply valve 71 are changed to a closed state, and just after this change the particle discharge valve 51 is changed to an open state. This state is maintained for, e.g., 1 second. After, e.g., 0.7 second from the particle discharge valve 51 being changed to the open state, the counter air discharge valve 304 is opened for, e.g., 0.1 second. Thereby, the counter air is introduced into the first counter room 210.

In this case, it is preferred to set a relation between a valve opening duration (t) of the counter air discharge valves 304, 305 and a duration (T) to $T/t \leqq 5$, where the duration (T) is a time duration required for recovering a pressure in the first counter room 210 to a normal level before applying the counter air. Thereby, it is possible to perform a rapid pressure increase due to the counter air supply and a rapid pressure decrease after that in the first counter room 210. Therefore, it is possible to remove the fine particles from the filter main body 20 and transport the removed fine particle to the second counter room 212 referred below as (B) effectively by the counter air.

After finishing the regenerating process of the first filter 2, a regenerating process of the second filter 4 is performed continuously. As is the same as the filter 2, the exhaust gas discharge valve 82 and the exhaust gas supply valve 72 are changed to a closed state , and just after this change the particle discharge valve 52 is changed to an open state. This state is maintained for, e.g., 1 second. After, e.g., 0.7 second from the particle discharge vale 51 being changed to the open state, the counter air discharge valve 305 is opened for, e.g., 0.1 second. Thereby, the regenerating processes of the first filter 2 and the second filter 4 are finished. After that, the first filter 2 and the second filter 4 perform a fine particle trapping operation of the exhaust gas.

(B) Transporting Process

In the transporting process, the fine particles removed by the counter air are transported to the process container 61. In this embodiment, the removed fine particles are transported to the second counter room 212 by a pressure of the counter air, but after that the removed fine particles are transported to the process container 61 through the transport pipe 5 by gravity not by the counter air. Therefore, it is possible to transport the fine particles by a small amount of the counter air which is not affected to a performance of a valve of, e.g., the exhaust brake.

(C) Processing process

The fine particles transported to the process container 61 in the process portion 6 are fired on the plate 62 arranged at a bottom of the process container 61 by using the electric heater 50 and discharged. Thereby, the counter air processing process of the fine particles are finished.

In the first embodiment mentioned above, the exhaust gas discharge valves 81 and 82 are arranged respectively, but it is possible to use the valve of the exhaust brake as the exhaust gas discharge valves 81,82. That is to say, in the vehicles such as bus, track, and so on, in which the diesel engine is assembled, a valve for closing an opening area in an exhaust gas passage is arranged so as to decrease a revolution speed of the diesel engine. The valve mentioned above is used as the exhaust gas discharge valves arranged in the exhaust gas discharge pipe. In this case, it is possible to decrease the number of the valves to be used.

Second Embodiment

Figure 12:
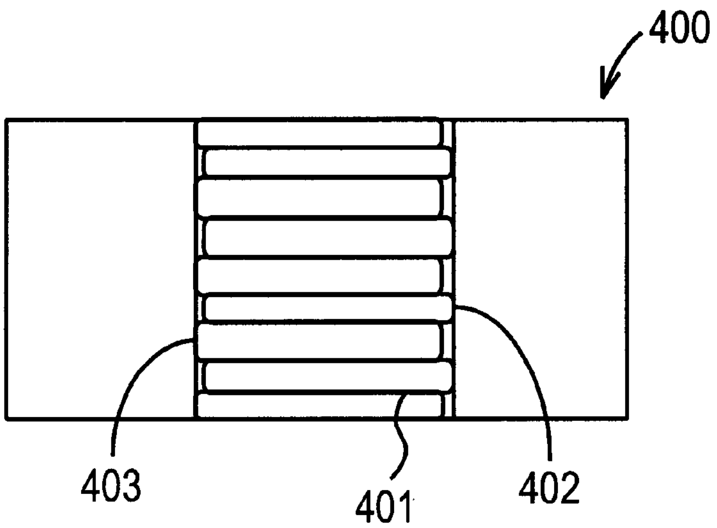
FIG. 12 is a cross sectional view depicting a filter according to a second embodiment of the invention.
Figure 13:
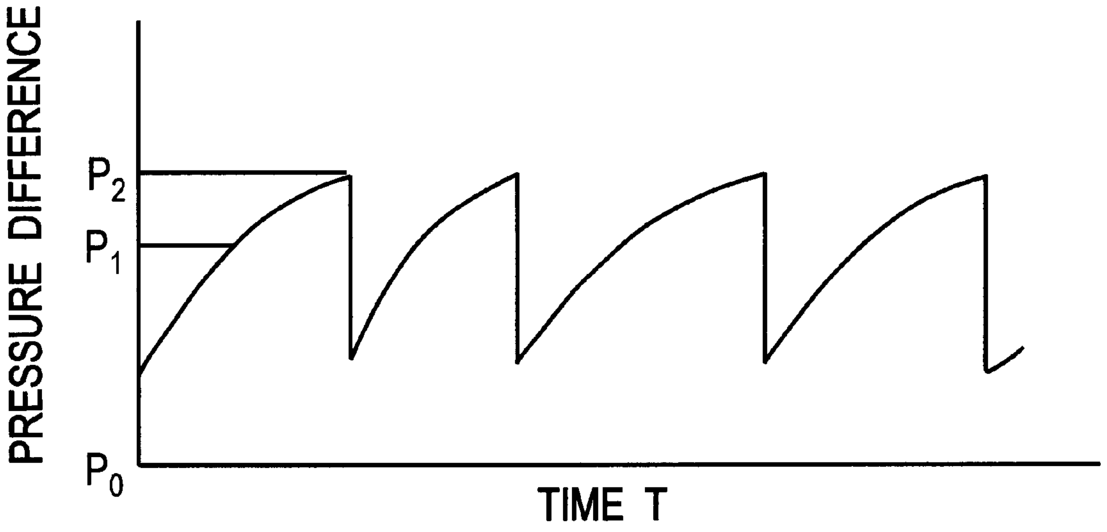
FIG. 13 is a timing chart showing a relation between a pressure difference defined by pressures at an inlet portion and an outlet portion of the filter main body according to the second embodiment of the invention.

A second embodiment of the present invention is shown in FIGS. 12 and 13. In the first embodiment mentioned above, the counter air processing process is performed alternately and periodically to the first filter 2 and the second filter 4. However, in the second embodiment, the counter air processing process is performed when a pressure difference of the filter main body at between the inlet portion and the outlet portion becomes more than a predetermined value.

If the exhaust gas from the diesel engine is passed through a filter 400, a pressure difference $P_0$ is generated at between an inlet portion 402 and an outlet portion 403 of a filter main body 401, since the filter main body 401 has a resistivity for transmitting the exhaust gas. In this case, if the counter air processing process i continued, a pressure at the inlet portion 402 is increased corresponding to an amount of the fine particles accumulated in the filter main body 401. Therefore, a pressure difference $P_1$ at between the inlet portion 402 and the outlet portion 403 is detected, and the counter air processing process is performed when the detected pressure difference $P_1$ is beyond a predetermined pressure difference $P_2$. After the counter air processing process is finished, the pressure difference $P_1$ is gradually decreased to a level equal to the initial pressure difference $P_0$ ideally or less. In this case, the pressure difference $P_2$ is determined by an amount of the fine particles to be trapped and a trapping performance of the filter main body, and it is less than 3 kPa preferably less than 2 kPa.

Since the fine particles trapped by the filter main body are light and gathered, it is effective to perform the counter air processing process when the fine particles are accumulated to some extent. However, if the fine particles are accumulated in excess, a pressure loss of the filter main body is larger and thus an effect of the counter air processing process is decreased. Therefore, it is necessary to perform the counter air processing process when the pressure difference, i.e. pressure loss is more than a predetermined value. In the second embodiment according to the invention, since the counter air processing process is controlled by the pressure difference $P_1$ at between the inlet portion 402 and the outlet portion 403 of the filter main body 401, it is possible to perform the counter air processing process effectively at a minimizing frequency.

Third Embodiment

Figure 14:
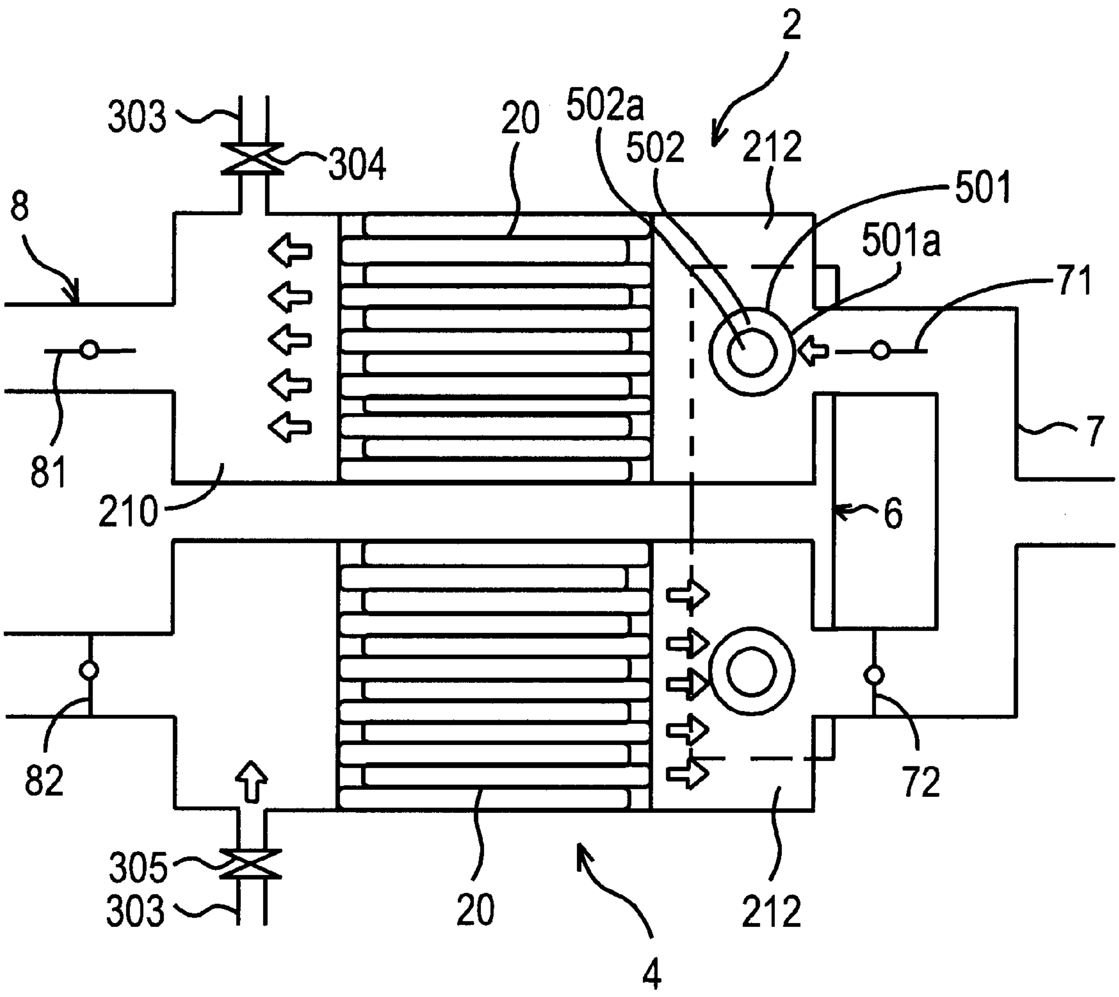
FIG. 14 is a schematic view illustrating a third embodiment of the exhaust gas processing apparatus according to the invention.
Figure 15:
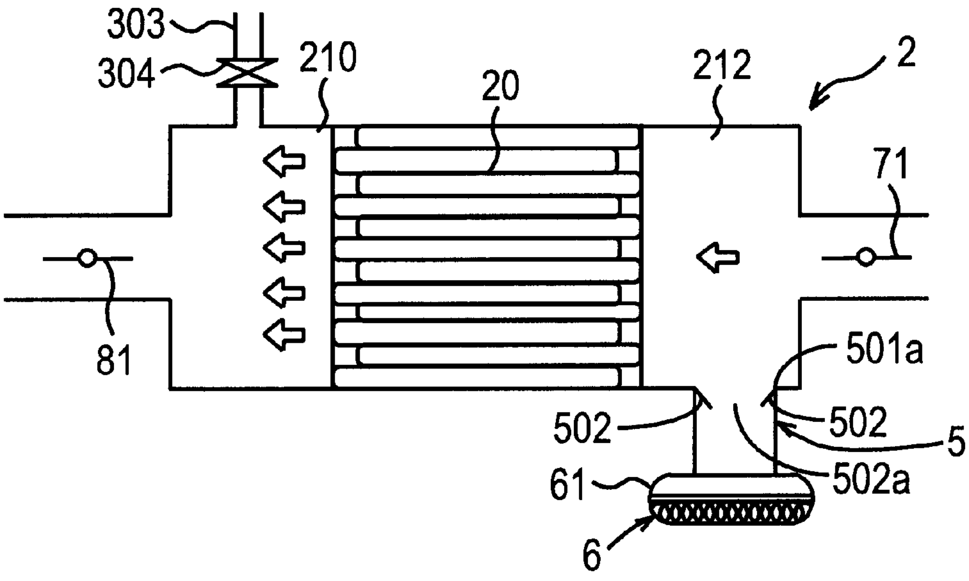
FIG. 15 is a schematic view depicting a main portion of the third embodiment in the case of the fine particle trapping operation according to the invention.
Figure 16:
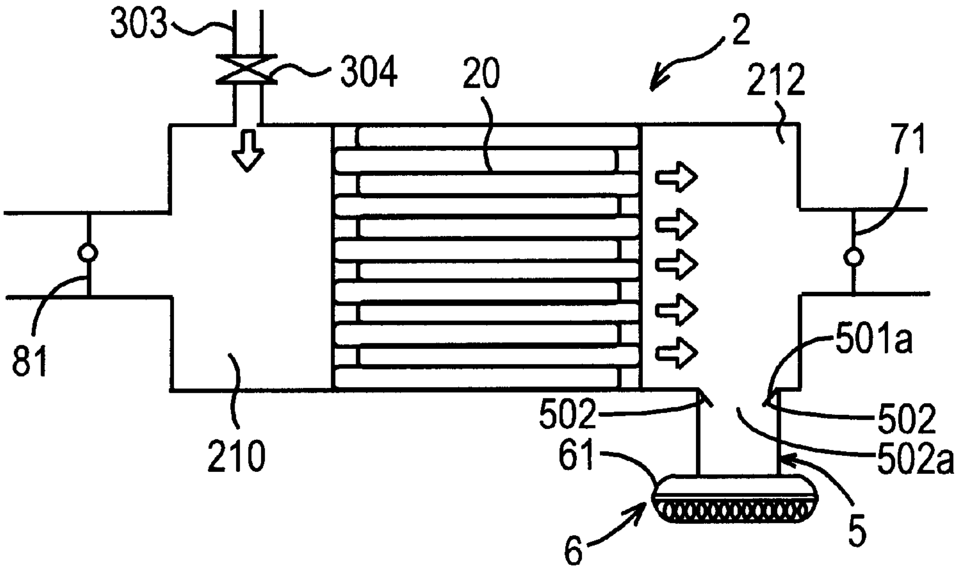
FIG. 16 is a schematic view showing a main portion of the third embodiment in the case of the filter regenerating operation according to the invention.

A third embodiment of the present invention is shown in FIGS. 14 to 16. In the third embodiment, a partition is arranged instead of the particle discharge valve arranged at a position in the transport pipe near the transport inlet.

A partition 502 inclined toward the process portion 6 from the second counter room 212 is arranged along a peripheral portion 501*a* of a transport inlet 501. The partition 502 has an opening 502*a* at its center portion. The fine particles removed from the filter main body 20 and transported to the second counter room 212 fall into the process container 61 by gravity through the opening 502*a*. Since the partition 502 is inclined toward the process container 61, the fine particles accumulated in the process container 61 are not returned to the second counter room 212.

In the third embodiment according to the invention, since it is not necessary to use the particle discharge valve arranged near the transport inlet of the transport pipe, it is possible to reduce the number of the parts to be used. Moreover, since the number of the valves is reduced, a noise due to an operation of the valve can be deduced.

In the present invention, a position of the partition is not limited to the position near the inlet portion, but it is arranged at any inner wall of the transport pipe between the second counter room and the process container.

In order to completely prevent a return of the fine particles into the second counter room 212, it is possible to use the particle discharge valve arranged near the inlet of the transport pipe together with the partition mentioned above.

Fourth Embodiment

Figure 17:
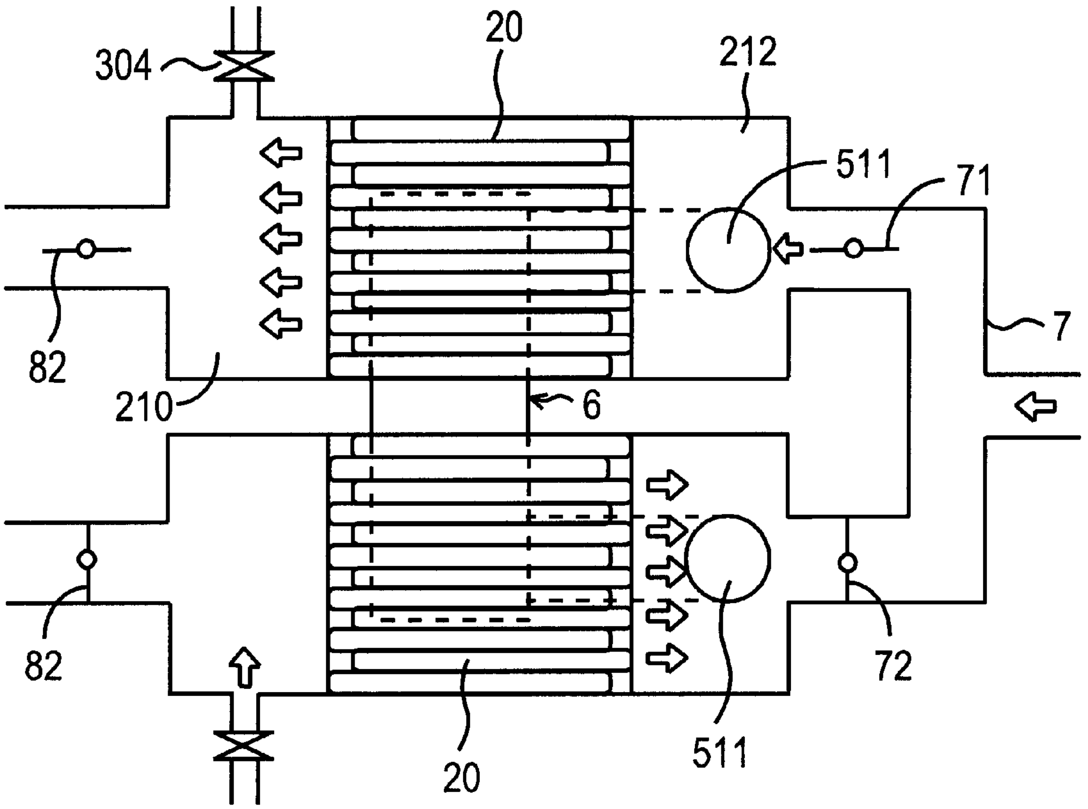
FIG. 17 is a schematic view illustrating a fourth embodiment of the exhaust gas processing apparatus according to the invention.
Figure 18:
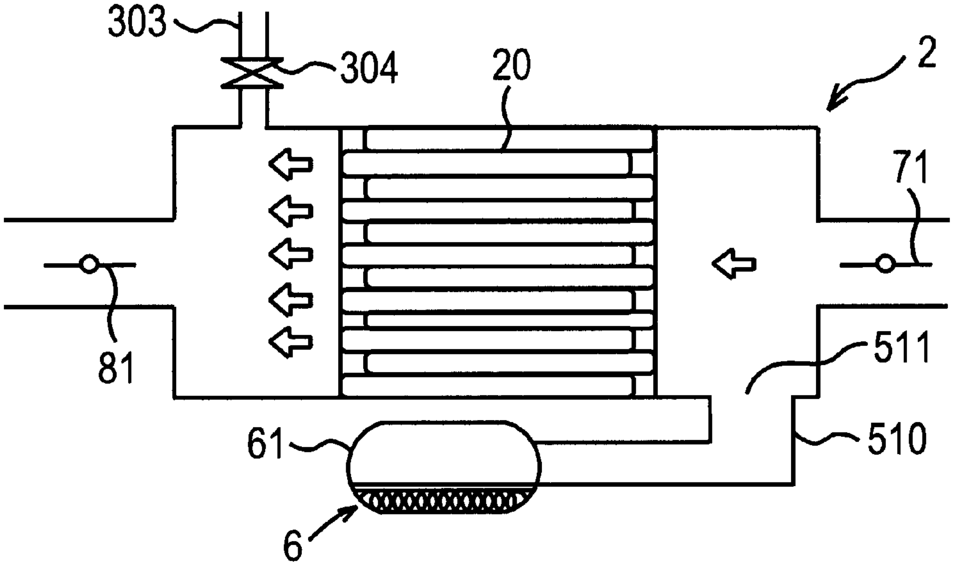
FIG. 18 is a schematic view depicting a main portion of the fourth embodiment in the case of the fine particle trapping operation according to the invention.
Figure 19:
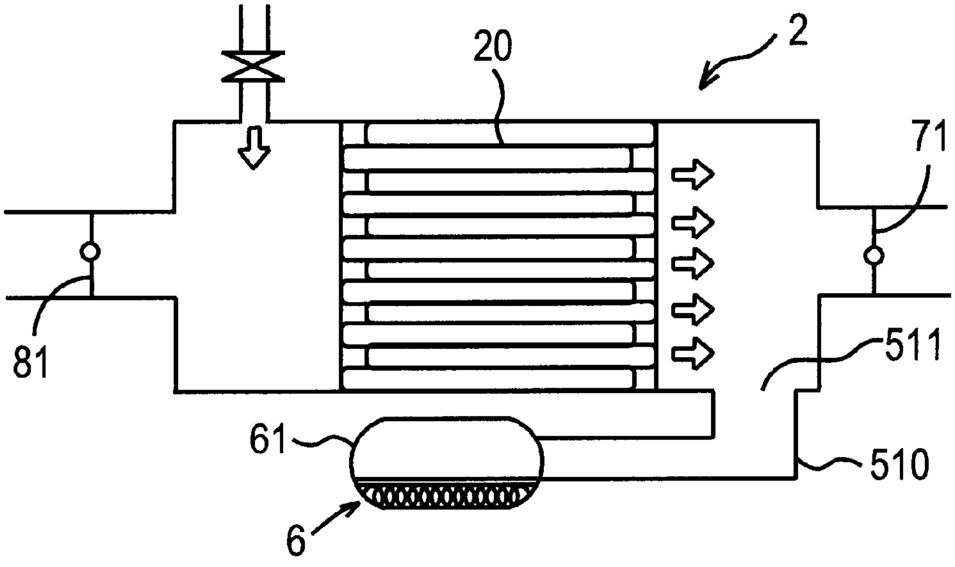
FIG. 19 is a schematic view showing a main portion of the fourth embodiment in the case of the filter regenerating operation according to the invention.

A fourth embodiment of the present invention is shown in FIGS. 17 to 19. In the fourth embodiment, the process portion is arranged under the filter at a position remote from the second counter room so as not to return the fine particles into the second counter room.

The process portion 6 is arranged under the filter 2 through a transport pipe 510. That is to say, the process portion 6 is arranged at a position remote from an inlet 511 formed to the second counter room 212 toward an exhaust gas flowing direction. A length of the transport pipe 510 is set to a length in which the fine particles are not returned to the second counter room 212 even if the particle discharge valve or the partition is not used.

In the fourth embodiment, since it is not necessary to use the particle discharge valve and the partition, the number of the parts to be used can be reduced. Moreover, since the number of the valves to be operated can be reduced, it is possible to reduce an amount of air supplied to actuators for operating the valves.

In the first to fourth embodiments of the invention, use is made of two filters, but it is possible to use three or more filters.

Figure 11:
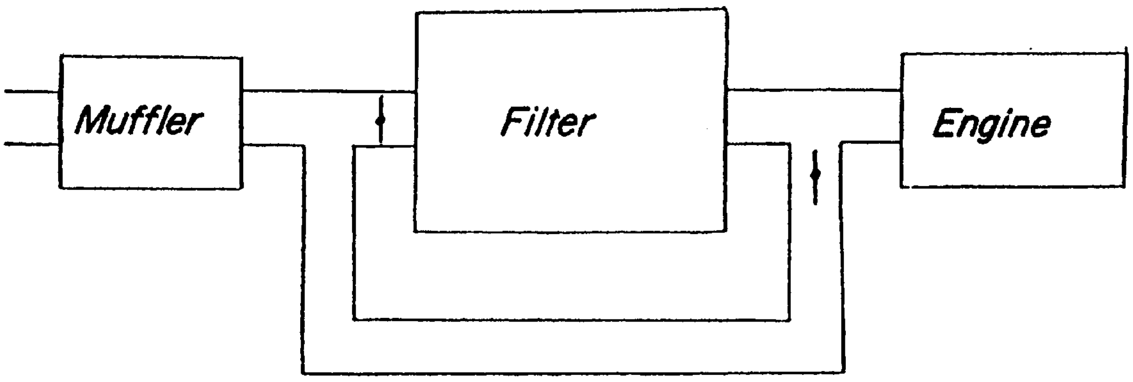
FIG. 11 is a schematic view illustrating another embodiment of the exhaust gas processing apparatus according to the invention in which one filter is used.

Moreover, as shown in FIG. 11, it is possible to use one filter by forming a by-pass pipe in the filter. In this case, during the counter air processing, since the exhaust gas is flowed in the by-pass pipe, the fine particles in the exhaust gas are not trapped by the filter. However, the counter air processing requires generally a short time, and thus it is no problem in an actual use. Further, if the counter air processing is not performed during a drive on an ascending road in which a large amount of the fine particles are generated but performed during a engine drive mode, i.e., a drive on a highway in which a generation of the fine particles is small, it is possible to reduce an amount of the fine particles not trapped by the filter and discharged through the by-pass pipe during the counter air processing. Furthermore, if an oxidizing catalyst is arranged in the by-pass pipe and the fine particles are fired in the oxidizing catalyst, it is possible to reduce an amount of the fine particles discharged from the by-pass pipe.

As mentioned above, according to the invention, since the counter air is uniformly and rapidly introduced to respective portions in the filter main body, it is possible to remove the fine particles trapped in the filter main body effectively by a simple apparatus. Moreover, since the removed fine particles are transported to the process portion and fired, it is possible to regenerate the filter.

In the apparatus according to the invention, since the exhaust gas supply valve is arranged in the exhaust gas supply pipe, the fine particles are not returned to the exhaust gas supply pipe if the exhaust gas supply valve is closed. In this case, the fine particles are not introduced into the filter through the exhaust gas supply pipe.

In the method and the apparatus according to the invention, if the filter is made of a honeycomb structural body having a plurality of through holes arranged parallel which are defined by porous partitions having a filter function, and exhaust inlets and exhaust outlets of the through holes are sealed alternately, it is possible to perform the fine particle trapping operation and the fine particle removing operation effectively.

In the method according to the invention, if the filter main body is arranged in such a manner that a passage direction of the through hole of the filter is horizontal or inclined to a horizontal line, a vehicle assembling performance can be improved.

In the method according to the invention, if the counter air discharge valve is opened when a pressure difference at between an inlet portion and an outlet portion of the filter main body is more than a predetermined value, the filter regeneration by the counter air can be performed at a proper interval. Therefore, the fine particles can be removed effectively, and an amount of the counter air can be minimized.

In the method according to the invention, if a relation between a valve opening duration (t) of the counter air discharge valves and a duration (T) is set to $T/t \leqq 5$, where the duration (T) is a time duration required for recovering a pressure in the first counter room to a normal level before applying the counter air, a pressure in the first counter room is increased by the counter air, and then the pressure is decreased effectively. Therefore, the fine particle removing and transporting operations can be performed effectively by a small amount of the counter air.

In the method according to the invention, if one end of the counter air supply pipe is projected in the first counter room preferably in a tapered shape, a pressure loss when the counter air is introduced into the first counter room can be reduced.

In the apparatus according to the invention, if the exhaust gas discharge valve arranged in the exhaust gas pipe is used as a valve for an exhaust brake, the number of the valves to be used can be reduced.

In the apparatus according to the invention, if a particle discharge valve or a partition is arranged in the transport pipe, or if the process portion is arranged under the filter and at a position remote from the second counter room in an exhaust gas flowing direction, or if a connection portion between the transport pipe and the second counter room is arranged at a position lower than the exhaust gas supply pipe, the fine particles are not returned to the filter main body by the exhaust gas.

In the apparatus according to the invention, if a peripheral portion of at least an exhaust gas inlet end of the filter main body is sealed airtightly in such a manner that the filter main body is compressed in a through hole direction, the filter main body is not moved gradually if a vibration due to the engine or a vibration during a movement of the vehicle is applied thereto, and thus it is possible to prevent a crack generation and a breakage of the filter main body. Moreover, it is possible to prevent an exhaust gas flow without passing through the filter main body. Further, it is possible to decrease a support pressure of the filter main body, and thus it is possible to prevent a breakage of the filter main body.

In the apparatus according to the invention, if the fine particles are fired by the firing means such as electric heater, sheath heater, glow plug, and burner, or by using the oxidizing catalyst or the microwave generator together with the firing means, it is possible to fire the fine particles effectively and rapidly.

What is claimed is:

1. An exhaust gas treatment apparatus through which an exhaust gas containing fine particles is passed along a flow direction, comprising:

a first filter comprising a first filter main body, a first counter room provided downstream of the first filter main body, and a second counter room provided upstream of the first filter main body;

a second filter comprising a second filter main body, a first counter room provided downstream of said second filter main body, and a second counter room provided upstream of said second filter main body;

first and second exhaust gas inlets for separatedly supplying exhaust gas to said first and second filters, respectively, said first and second exhaust gas inlets being connected to and receiving exhaust gas from a common inlet pipe;

first and second exhaust gas outlets for discharging exhaust gas from the first and second filters, respectively;

a process portion isolated from exhaust gas flow through the filters, in which fine particles removed from the filters are fired;

transport means for interconnecting each of the second counter rooms to said process portion;

a counter air supply means for supplying a counter flow of air to the first counter rooms, along a flow direction opposite to the flow direction of the exhaust gas, said counter air supply means being located (1) so that the flow direction of the counter air from said counter air supply means into the first counter rooms is perpendicular to a through hole of a filter main body and (2) separate from said exhaust gas outlets;

first and second exhaust gas supply valves provided in the first and second exhaust gas inlets, respectively; and first and second exhaust gas discharge valves respectively provided in said fist and second exhaust gas outlets.

2. The apparatus of claim 1, wherein each of the filter main bodies is comprised of a honeycomb structural body including a plurality of porous partition walls intersecting each other to form a plurality of parallel throughholes, each honeycomb structural body having an inlet end and an outlet end, wherein the throughholes are alternately sealed at said inlet and outlet ends.

3. The apparatus of claim 1, wherein said transport means comprises first and second transport pipes, each pipe including a particle discharge valve provided therein.

4. The apparatus of claim 1, wherein said transport means comprises first and second transport pipes, each transport pipe including a partition provided therein.

5. The apparatus claim 1, wherein said process portion is positioned below the second counter rooms of the first and second filters, thereby preventing return of fine particles from said process portion to the filters.

6. The apparatus of claim 1, wherein said transport means comprises first and second transport pipes respectively extending below the second counter rooms of the first and second filters.

7. The apparatus of claim 2, wherein said first and second filters are axially compressed such that the first and second filter main bodies are air-tightly sealed along the first and second inlets, respectively.

8. The apparatus of claim 1, wherein the exhaust gas discharge valves function as an exhaust brake.

* * * * *